United States Patent
Boyd et al.

(10) Patent No.: US 6,801,547 B1
(45) Date of Patent: Oct. 5, 2004

(54) RANGING CELL DETECTION IN A NOISY ENVIRONMENT

(75) Inventors: Edward W. Boyd, Petaluma, CA (US);
Ross G. Werner, Woodside, CA (US);
Wai Y. Kan, San Jose, CA (US);
Robert J Deri, Pleasanton, CA (US);
Jamie Riotto, Montara, CA (US);
Barry A. Perkins, San Francisco, CA (US)

(73) Assignee: Terawave Communications, Inc., Hayward, CA (US)

( * ) Notice: Subject to any disclaimer, the term of this patent is extended or adjusted under 35 U.S.C. 154(b) by 0 days.

(21) Appl. No.: 09/576,099

(22) Filed: May 22, 2000

(51) Int. Cl.[7] .................................................. H04J 3/06
(52) U.S. Cl. ........................ 370/508; 370/443; 359/110; 398/35; 398/99
(58) Field of Search ................................ 370/385–395, 370/508, 294, 348, 465, 442–445; 398/35, 99; 359/136, 110, 153

(56) References Cited

U.S. PATENT DOCUMENTS

| 5,299,044 | A | * | 3/1994 | Mosch et al. .................. 398/35 |
| 5,812,528 | A | * | 9/1998 | VanDervort .................. 370/235 |
| 5,872,645 | A | * | 2/1999 | Proctor ......................... 398/99 |
| 6,023,467 | A | * | 2/2000 | Abdelhamid et al. ..... 370/236.2 |
| 6,243,364 | B1 | * | 6/2001 | Pihlaja ........................ 370/294 |
| 6,400,705 | B1 | * | 6/2002 | Wolters et al. .............. 370/348 |
| 6,570,886 | B1 | * | 5/2003 | De Groote et al. ......... 370/442 |
| 6,636,527 | B1 | * | 10/2003 | Lee et al. .................... 370/465 |

* cited by examiner

*Primary Examiner*—Chi Pham
*Assistant Examiner*—Prenell Jones
(74) *Attorney, Agent, or Firm*—Fenwick & West LLP

(57) ABSTRACT

A technique to identify a response cell in a ranging grant procedure is disclosed herein. The format of the response cell reduces the probability of erroneous response cell detection. The response cell is a conventional ATM cell whose payload includes multiple cell delineation bytes (CDBs).

16 Claims, 4 Drawing Sheets

RANGING CELL DETECTION IN A NOISY ENVIRONMENT

FIELD OF THE INVENTION

The present invention pertains to the field of communication networks, including apparatus and data transmission protocols for the transport of digital data over a shared point-to-multipoint network.

RELATED ART

The design and deployment of point-to-multipoint broadband networks is an active field. See for example U.S. Pat. No. 5,978,374 issued Nov. 2, 1999, which is incorporated by reference herein in its entirety. In such networks, downstream signals are broadcast from a single optical line terminal ("OLT") or head-end facility to multiple end user stations, i.e., Optical Network Unit ("ONU"), via point-to-multipoint transmission, and upstream signals are transmitted from each respective ONU to the OLT facility via point-to-point transmission. With reference to FIG. 1, in a preferred embodiment, the network 20 is a point to multipoint ATM Passive Optical Network (APON) including an optical line terminal (OLT) 22 and a plurality of optical network units (ONU) 28a, 28b. A network end user interfaces with the network through an ONU.

The embodiment of a passive optical network (PON) 20 illustrated in FIG. 1 includes an OLT 22 connected to a passive optical power splitter 34 by a single optical fiber 36. The PON further includes ONUs 28a, 28b connected to the splitter 36 by optical fibers 38, 40. Each ONU can provide service to at least one end user via at least one virtual channel. An ONU often services a plurality of end users via a plurality of virtual channels.

The illustrated embodiment includes a scheduler 101 that performs upstream scheduling. According to a preferred embodiment, the scheduler 101 exists as a block of an OLT Media Access Control (MAC) ASIC.

As the network system receives end user produced data for upstream transmission via a virtual channel, the system breaks the data up into cells for upstream transmission. The network then either immediately transmits the cells, or the end user's ONU stores the cells in an upstream queue associated with the end user's virtual channel to await transmission.

The ONUs in an APON system share a single upstream channel for sending data into the network. The use of the upstream is granted by the OLT based on Quality of Service (QoS) requirements and purchased bandwidth limits. Within an ONU, many queues are addressable by the OLT. The OLT differentiates traffic from a plurality of queues based on QoS, service contract, user, and destination parameters. The OLT's upstream scheduler takes queue information from the ONUs and management software configured service restrictions to grant access to the upstream in a predictable, fast, and efficient manner.

The OLT typically resides at a hubbing point such as a Central Office (CO) or Point of Presence (POP). The OLT provides the interface between the access network and the ONU service delivery node.

At least one passive branching device, e.g., splitter 34, provides point-to-multipoint connectivity between the OLT and multiple ONUs 28a, 28b. More specifically, a PON can use either a single power splitter or cascaded power splitters as branching devices for OLT to ONU communications. An individual ONU 28a often resides on or near a subscriber's premises. As noted above, an individual ONU provides service to at least one virtual channel and can provide service to a plurality of virtual channels.

The elimination of active elements between the OLT and the ONU reduces the need for costly powering, right-of-way space, and ongoing maintenance for active elements. Furthermore, using a point-to-multipoint system allows multiple subscribers to share the expense of the OLT.

The OLT can include a laser 24, e.g., a 1500 nm laser, for downstream transmission. In addition, the OLT can include a burstmode receiver 26, e.g., tuned for receiving at 1300 nm. Similarly, the ONUs can include a transmitting laser 32a, and a receiver 30a.

The OLT 22 includes a media access controller (MAC). The MAC controls the transport of various digital data streams between the OLT and the ONUs. In particular, downstream transmission in the PON 20 is via point-to-multipoint broadcast from the OLT 22 to all (active) ONUs 28a, 28b over the downstream fiber network. Upstream transmission is via individual point-to-point transmission from the respective ONUs 28a, 28b to the OLT 22 over the upstream fiber network.

Certain point-to-multipoint broadband networks can support a variety of independent communication services, such as traditional two-way telecommunication services (e.g., telephone services), broadcast video services (e.g., CATV), and a full range of non-streaming digital data services.

The ITU-T Recommendation G.983.1 (1998), Broadband Optical Access Systems Based on Passive Optical Networks (PON) ("Recommendation"), which is incorporated herein by reference in its entirety, describes a point-to-multipoint network that uses optical fiber technology. This Recommendation describes characteristics of an Optical Access Network (OAN) with the capability of transporting various services between the user-network interface and the service node interface. The OAN described in this Recommendation should enable the network operator to provide a flexible upgrade to meet future customer requirements, in particular in the area of the Optical Distribution Network (ODN). The ODN considered is based on point-to-multipoint tree and branch option. This Recommendation proposes the physical layer requirements and specifications for the physical media dependent layer, the Transmission Convergence (TC) layer and the ranging protocol of an ATM-based Passive Optical Network (ATM-PON).

The Recommendation states that each ONU shall transmit cells upstream to the OLT during distinct and specified time slot(s). The OLT determines the time slots at which it shall receive cells from ONUs. Such time slot allocation prevents different ONUs from transmitting cells at the same time and thereby interfering.

Section 8.4 of the Recommendation describes a "ranging grant" procedure to determine the time slots at which the OLT receives upstream cells from the ONUs. Under the ranging grant procedure, the OLT commands the ONU to issue a "ranging cell" at a certain time slot and then the OLT determines transmission delay from the ONU by measuring the expected and actual time of receipt of a "ranging cell" from the ONU. The ONU then adjusts the time it transmits cells to the OLT so that the OLT will receive cells from the ONU when expected. The ranging grant procedure is typically performed either on power-up, periodically to accommodate physical changes in the cable that affect transmission characteristics, and/or when a new ONU is added to the network.

However, the ranging procedure set forth in the Recommendation may not accurately measure the transmission delay between the OLT and an ONU. For example, where the communication path between the OLT and select ONU is noisy, the OLT may mistakenly identify noise as a ranging cell from the ONU. Noise is particularly a problem in the ranging procedure because noise is present during the multiple unallocated time slots which surround a ranging cell. Thereby, the OLT may erroneously determine the transmission delay. Thus, what is needed is an improved ranging procedure.

SUMMARY

One embodiment of the present invention includes a method to identify a response cell in a ranging grant procedure. The format of the response cell reduces the probability of erroneous response cell detection. In this embodiment, the response cell includes a conventional ATM cell whose payload includes multiple cell delineation bytes (CDBs). In other embodiments, the response cell is any unique identifiable data structure.

DETAILED DESCRIPTION

U.S. Patent Application Ser. No. 60/206,509, filed May 22, 2000, entitled "Remote, Hierarchical, Bandwidth Provisioned, Rotating Priority Scheduler", inventor Edward W. Boyd, is incorporated herein by reference in its entirety.

An embodiment of the present invention includes use of a ranging PLOAM cell that is described in more detail herein to reduce the likelihood of erroneous ranging PLOAM cell detection.

Figure 1:
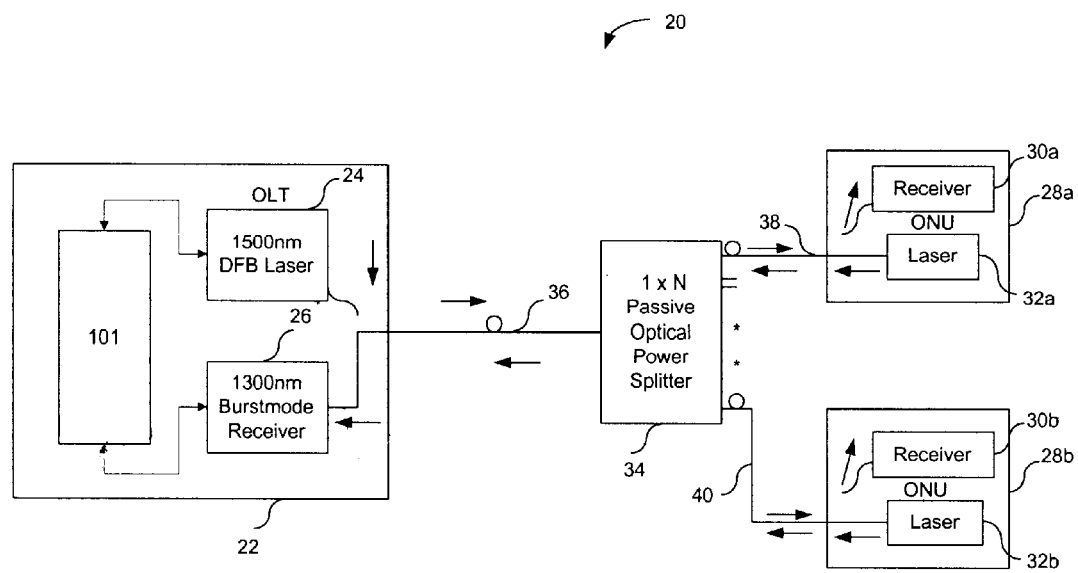
FIG. 1 depicts a network 20 that includes a point to multipoint ATM Passive Optical Network (APON).
Figure 2:
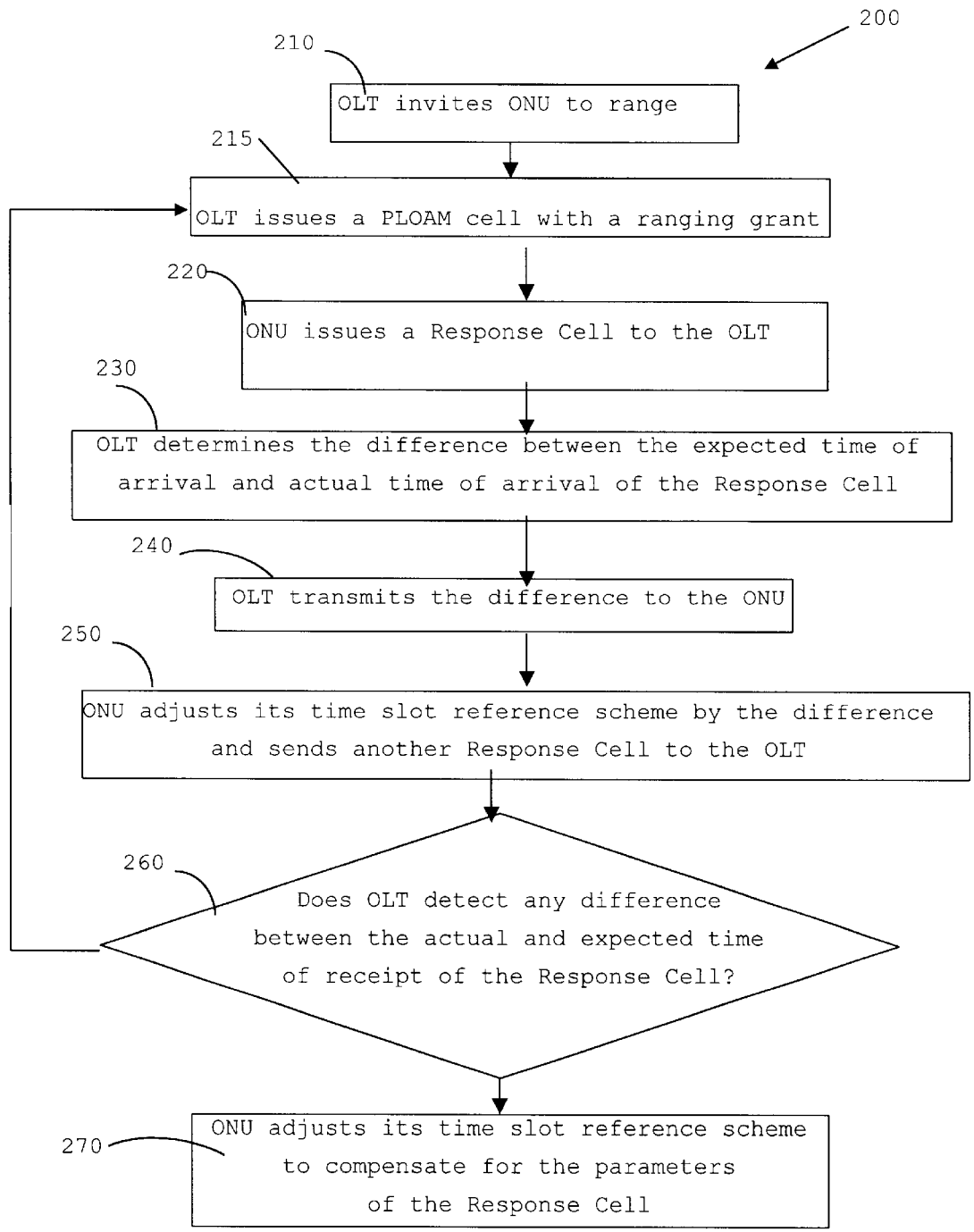
FIG. 2 depicts a suitable process 200 in accordance with an embodiment of the present invention.

FIG. 2 depicts a suitable process 200 in accordance with an embodiment of the present invention. This embodiment uses the network 20 described with respect to FIG. 1. Suitable implementations of the process 200 are by software, hardware, or firmware. In this embodiment, process 200 is repeated to range each ONU, one by one.

In step 210 of process 200, the OLT issues a management message in accordance with section 8.4 of the Recommendation to invite a specific ONU to range. Hereafter, in process 200 "ONU" refers to the specific ONU invited to range.

In step 215, the OLT issues a PLOAM cell that specifies a time slot in which the ONU should transmit an upstream cell to the OLT.

In step 220, the ONU waits for the designated time slot and transmits a ranging cell, in accordance with an embodiment of the present invention, to the OLT. A suitable embodiment of the ranging cell is depicted in FIG. 3 ("Response Cell").

Figure 3:
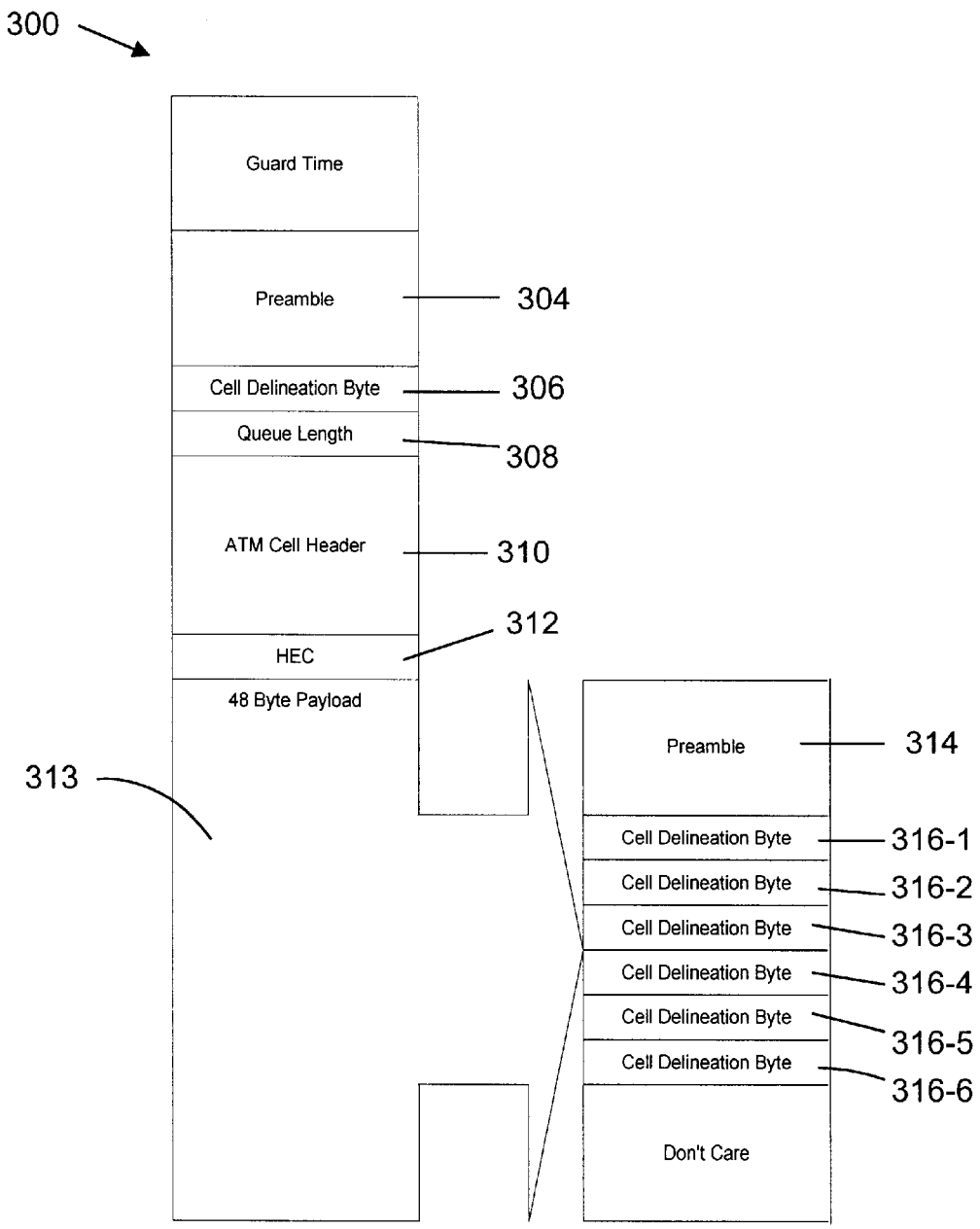
FIG. 3 depicts a Response Cell 300 in accordance with an embodiment of the present invention.

In accordance with an embodiment of the present invention, the Response Cell 300 of FIG. 3 includes a conventional ATM cell with multiple cell delineation bytes (CDBs), as opposed to a single CDB as set forth in the Recommendation. In this embodiment, a Response Cell includes a conventional preamble 304, conventional CDB 306, conventional queue length 308, conventional ATM cell header 310, conventional header error correction (HEC) 312, and payload 313. In this embodiment, the payload 313 includes a standard preamble 314, which is similar to preamble 304, and six consecutive CDBs (e.g., 316-1 to 316-6) each similar to CDB 306. In other embodiments of the present invention, the number of CDBs in payload 313 can be modified. The lower the number of consecutive CDBs, the higher the probability of erroneous detection. The higher the number of consecutive CDBs, the lower the probability of erroneous detection by the OLT. Thus, in a noisy environment, during the ranging procedure, the OLT is less likely to mistakenly detect the Response Cell from the ONU. In another embodiment, the Response Cell is any extended known data pattern and not necessarily an ATM cell.

In step 230, the OLT determines the time difference between the expected time of arrival and actual time of arrival of the Response Cell ("Difference"). The expected time of arrival of the Response Cell at the OLT may be set to represent the time slot at which the ONU transmits plus the maximum round trip transmission time from an ONU to the OLT and signal processing delays, as set forth in section 8.4 of the Recommendation.

In step 240, the OLT transmits the Difference to the ONU.

Figure 4:
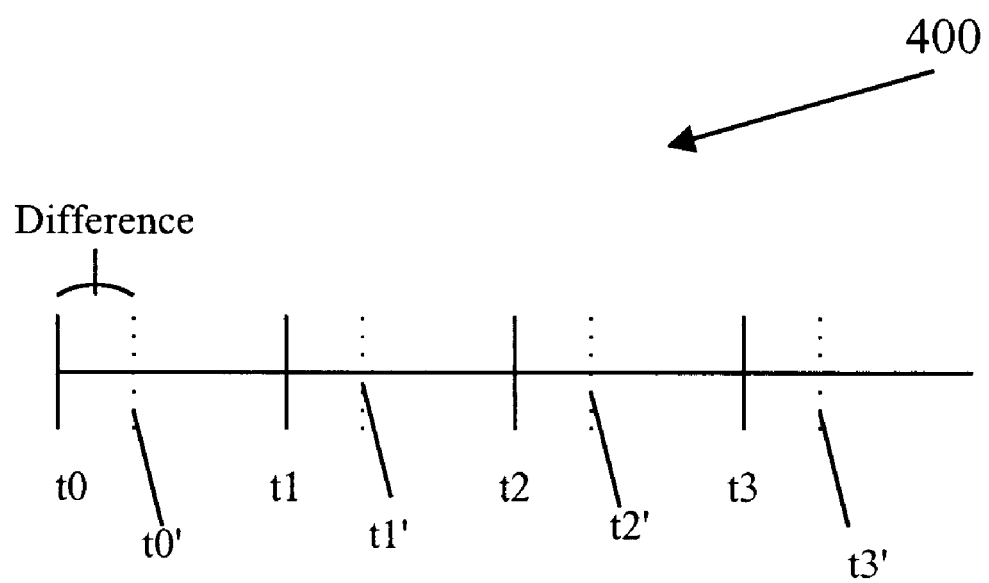
FIG. 4 depicts an example adjusted time slot reference scheme.

In step 250, the ONU delays its time slot reference scheme by the Difference. The time slot reference scheme is the timing scheme that the ONU uses to transmit cells upstream to the OLT. The ONU waits for the time slot assigned by the OLT, as delayed by the Difference, and then transmits another Response Cell to the OLT. Where the Difference is negative, the ONU moves the time slot reference scheme forward in time by the absolute value of the Difference. For example, FIG. 4 depicts an example of a time slot reference scheme 400. The solid vertical lines at times t0 to t3 represent a default time slot reference scheme by which the ONU will transmit cells upstream. The broken lines at times t0' to t3' represent a time slot reference scheme adjusted and delayed to compensate for the Difference.

According to step 260, steps 215 to 250 repeat until the OLT calculates a Difference of approximately zero.

In step 270, the ONU adjusts its time slot reference scheme to account for the extra time that the OLT uses to detect the Response Cell. The time the ONU detects the Response Cell should correspond to the beginning of the ATM header field of the Response Cell as opposed to the end of the CDB in the ATM payload. For example, in one embodiment, such extra time corresponds to the difference between the start of the ATM header 310 and the end of the last CDB in the ATM payload 313.

Modifications

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of performing a ranging grant procedure in a passive optical network having first and second nodes, the method comprising the steps of:

transmitting a ranging grant to the second node;

replying to the first node with a response cell, wherein said response cell includes at least two cell delineation bytes;

determining a difference between an expected time and an actual time of arrival of said response cell;

transmitting said difference to the second node; and adjusting a time slot reference scheme of the second node by said difference.

2. The method of claim 1, wherein the first node is an optical line terminal.

3. The method of claim 1, wherein the second node is an optical network unit.

4. The method of claim 1, further comprising the step of:

receiving said response cell by identifying said at least two cell delineation bytes, wherein identification of said at least two cell delineation bytes provides protection against erroneous detection of said response cell.

5. The method of claim 4, wherein said response cell includes at least three cell delineation bytes, to provide protection against erroneous detection of said response cell.

6. The method of claim 4, wherein said step of determining a difference between an expected time and an actual time comprises the steps of:

identifying a first time corresponding the when said response cell is received by said first node;

identifying said expected time for receiving said response cell; and determining said difference between said first time and said expected time, said first time being said actual time.

7. The method of claim 1, wherein said step of determining a difference between an expected time and an actual time comprises the steps of:

identifying a first time corresponding the when said response cell is received by said first node;

identifying said expected time for receiving said response cell; and determining said difference between said first time and said expected time, said first time being said actual time.

8. The method of claim 1, wherein said response cell includes at least three cell delineation bytes, to provide protection against erroneous detection of said response cell.

9. A system for performing a ranging grant procedure in a passive optical network comprising:

a first node in the passive optical network for transmitting a ranging grant to the second node; and a second node in the passive optical network, for replying to the first node with a response cell, wherein said response cell includes at least two cell delineation bytes;

wherein said first node determines a difference between an expected time and an actual time of arrival of said response cell and transmits said difference to said second node; and wherein said second node receives said difference and adjusts a time slot reference scheme of by said difference.

10. The system of claim 9, wherein the first node is an optical line terminal.

11. The system of claim 9, wherein the second node is an optical network unit.

12. The system of claim 9, wherein said first node receives said response cell and identifies said at least two cell delineation bytes, wherein identification of said at least two cell delineation bytes provides protection against erroneous detection of said response cell.

13. The system of claim 12, wherein said response cell includes at least three cell delineation bytes, to provide protection against erroneous detection of said response cell.

14. The system of claim 12, wherein said first node identifies a first time corresponding the when said response cell is received by said first node, and identifies said expected time for receiving said response cell, and determines said difference between said first time and said expected time, said first time being said actual time.

15. The system of claim 9, wherein said first node identifies a first time corresponding the when said response cell is received by said first node, and identifies said expected time for receiving said response cell, and determines said difference between said first time and said expected time, said first time being said actual time.

16. The system of claim 9, wherein said response cell includes at least three cell delineation bytes, to provide protection against erroneous detection of said response cell.

* * * * *